(12) United States Patent
Stravitz et al.

(10) Patent No.: US 6,443,481 B1
(45) Date of Patent: Sep. 3, 2002

(54) COLLAPSIBLE MOVABLE CART

(76) Inventors: David M. Stravitz, 16 Park Ave. Suite 14A, New York, NY (US) 10016; David Harris, S3335A Gillem Rd., Baraboo, WI (US) 53913; Clint Kolda, 113 Vista Dr., Cottage Grove, WI (US) 53527

( * ) Notice: Subject to any disclaimer, the term of this patent is extended or adjusted under 35 U.S.C. 154(b) by 0 days.

(21) Appl. No.: 09/598,036

(22) Filed: Jun. 21, 2000

(51) Int. Cl.[7] .................................................. B62B 7/06
(52) U.S. Cl. ........................ 280/651; 211/201; 280/42; 280/79.3; 280/47.35
(58) Field of Search ........................ 280/42, 651, 47.34, 280/47.35, 79.11, 79.3, 656; 211/198, 201; 108/67, 99

(56) References Cited

U.S. PATENT DOCUMENTS

| | | | | |
|---|---|---|---|---|
| 1,180,294 A | * | 4/1916 | Hunter | 280/651 |
| 1,879,102 A | * | 9/1932 | Collins | 280/651 |
| 3,931,985 A | * | 1/1976 | Knebel | 280/42 |
| 4,878,682 A | * | 11/1989 | Lee | 280/42 |
| 4,953,878 A | * | 9/1990 | Shragia | 280/651 |
| 5,857,695 A | * | 1/1999 | Crowell | 280/651 |

* cited by examiner

*Primary Examiner*—Michael Mar
(74) *Attorney, Agent, or Firm*—Frishauf, Holtz, Goodman & Chick, P.C.

(57) ABSTRACT

A movable cart having a collapsible frame with the frame being foldable into a collapsed or closed position for forming a narrow lateral profile and into an unfolded open position adapted to support a removable storage container. The frame comprises support members with each support member having a pair of legs extending downwardly from its opposite ends and a side arm extending between two of the legs on each opposite lateral side of the frame for securing the frame in the unfolded open position with the support members physically spaced apart to support the removable storage container. The side arms have hinges for folding the arms about a common plane lying in substantial parallel alignment with each support member. The frame also has a tray interconnecting the legs of the frame for forming a level platform adjacent the bottom end of the cart. The tray is foldable into substantially the same common plane into which the side arms fold so that upon folding the arms and tray, the cart collapses into the closed position with each of the support members drawn together into close proximity relative to one another.

31 Claims, 8 Drawing Sheets

COLLAPSIBLE MOVABLE CART

FIELD OF INVENTION

This invention relates to a collapsible movable cart which is adapted to support a removable storage container of file folders or a storage box in which various miscellaneous items and/or materials are to be stored.

BACKGROUND OF THE INVENTION

The movable cart of the present invention is readily folded into a compact form having a narrow lateral profile which permits the cart to be stored away when not in use and to be fully assembled simply by folding open the cart into its fully open position when needed. The cart is designed for supporting a storage container which is removably mounted into or upon the cart. Since the movable cart must support a storage container it must be sized commensurate with the size of the container so as to adequately support the container when it is loaded with file folders or storage items. Accordingly, the dimensions of the removable container dictate the size and dimensions of the cart which, in turn, has heretofore restricted the placement and location of the cart to areas where space is plentiful and the presence of a movable cart will be acceptable from an aesthetic viewpoint.

The movable cart of the present invention is foldable into a folded or collapsed position which forms a compact geometry having a very narrow lateral profile. In the collapsed position the cart can readily be stored away and will not occupy much space. When needed, the cart can be effortlessly unfolded into a fully open position. In the fully open position the cart will structurally support a storage container full of files or other items. No tools or other means are needed to fold up the cart into the folded position or to unfold the cart back into the fully open position.

SUMMARY OF THE INVENTION

The movable cart of the present invention, in general, comprises a collapsible frame which is readily folded up into a closed position having a narrow lateral profile and folded open back into the fully open position when needed. The frame comprises support members for supporting a removable storage container, with each support member having a pair of legs extending from opposite ends thereof, a side arm extending between two of the legs on opposite lateral sides of the frame for securing said frame in the unfolded open position with the support members physically spaced apart to support said removable storage container when mounted thereon, said side arms having hinges for folding said arms about a common plane lying substantially in parallel with each support member and a tray interconnecting the legs of the frame for forming a level platform adjacent the bottom end of the cart, with the tray being foldable into substantially the same common plane into which the side arms fold so that upon folding said arms and tray, said cart collapses into the closed position with each of said support members being drawn together into close proximity relative to one another.

BRIEF DESCRIPTION OF THE DRAWINGS

Other features and advantages of the present invention will become apparent from the following detailed description of the invention when read in conjunction with the accompanying drawings of which.

DETAILED DESCRIPTION OF THE INVENTION

Figure 1:
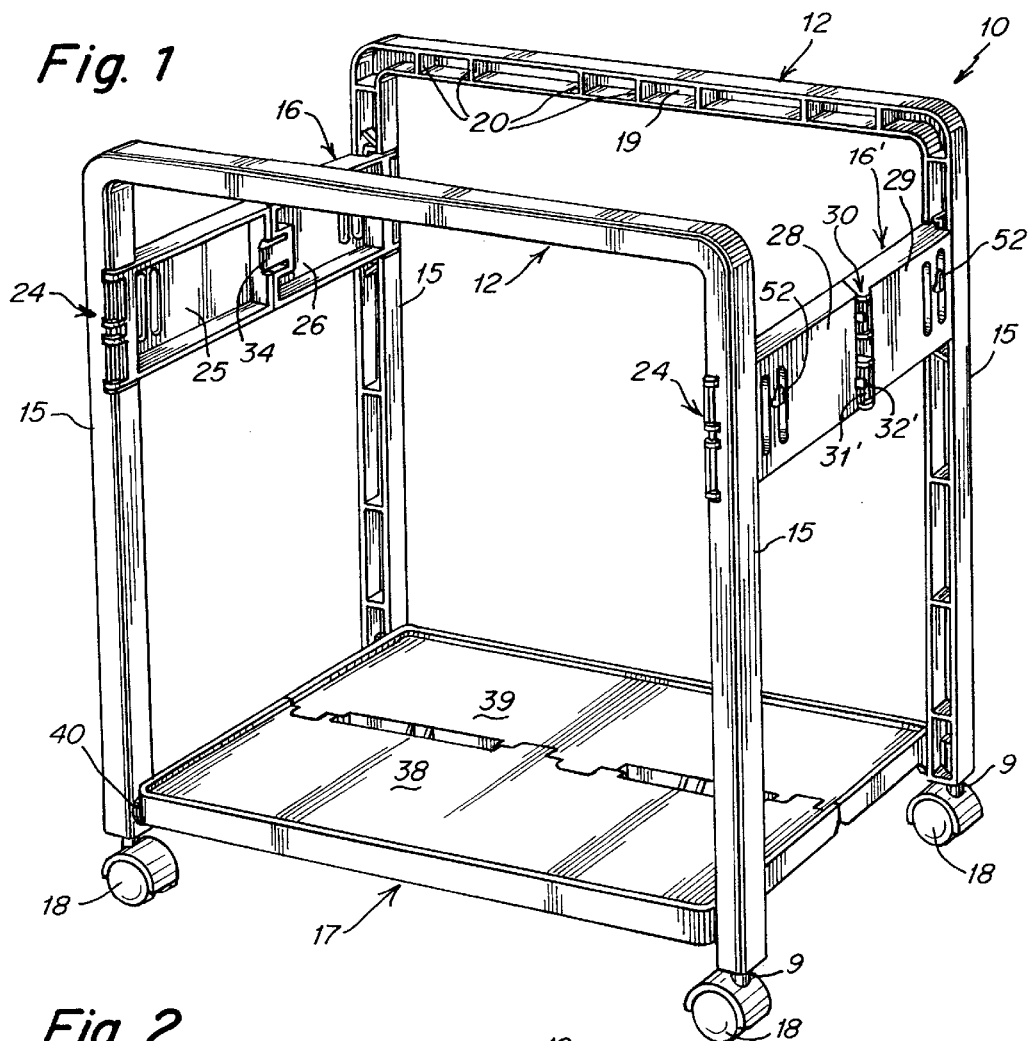
FIG. 1 is a perspective view of one embodiment of the movable cart of the present invention in the open position.
Figure 2:
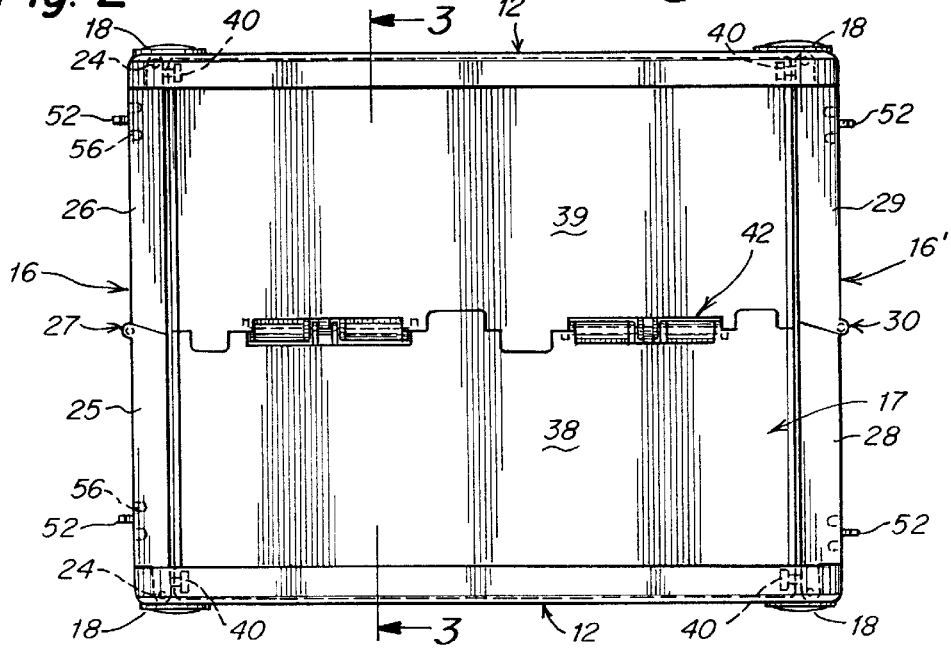
FIG. 2 is a top plan view of the cart of FIG. 1 in its open position.
Figure 10:
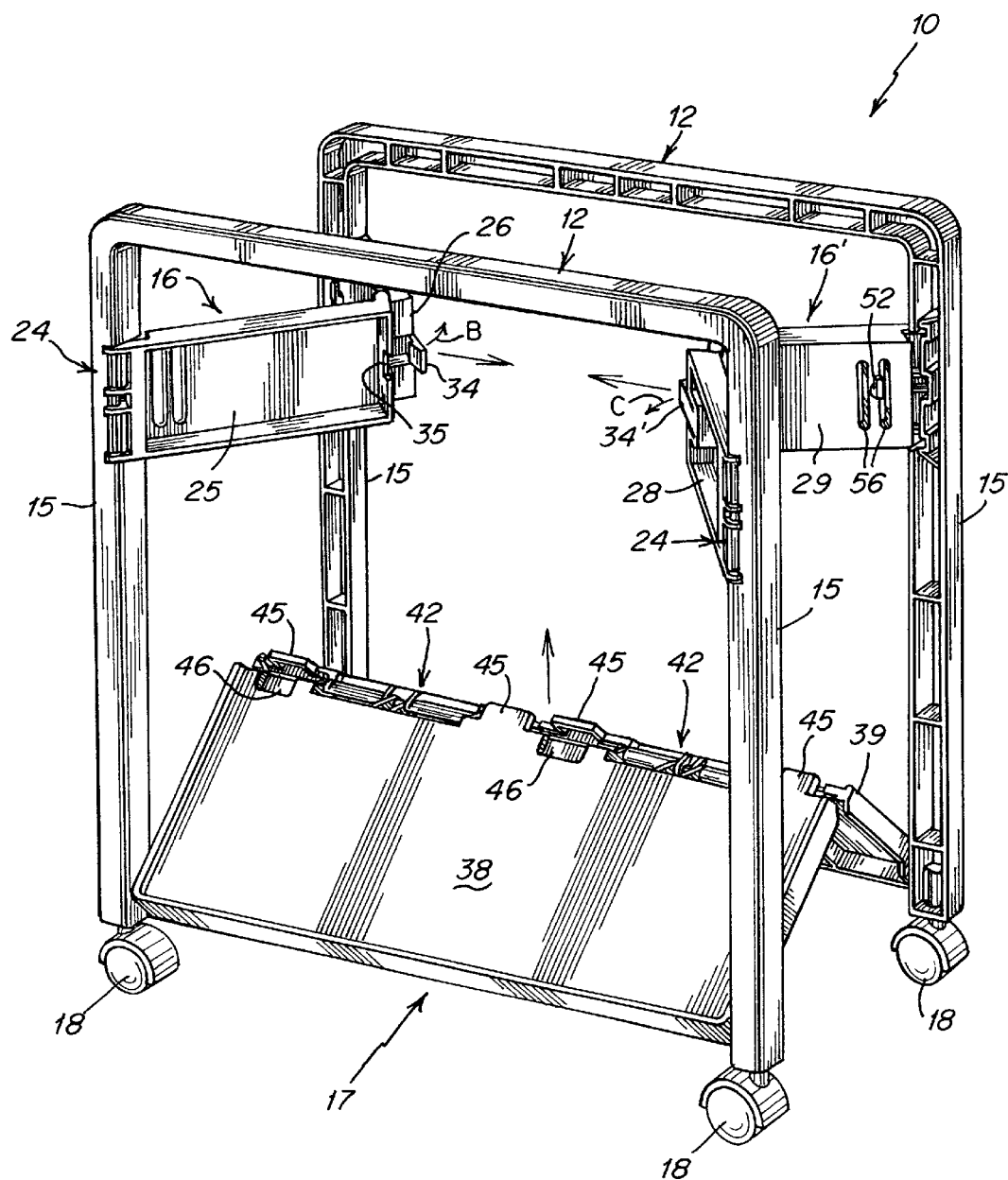
FIG. 10 is a perspective view of the cart of FIG. 1 in a partially collapsed position.
Figure 11:
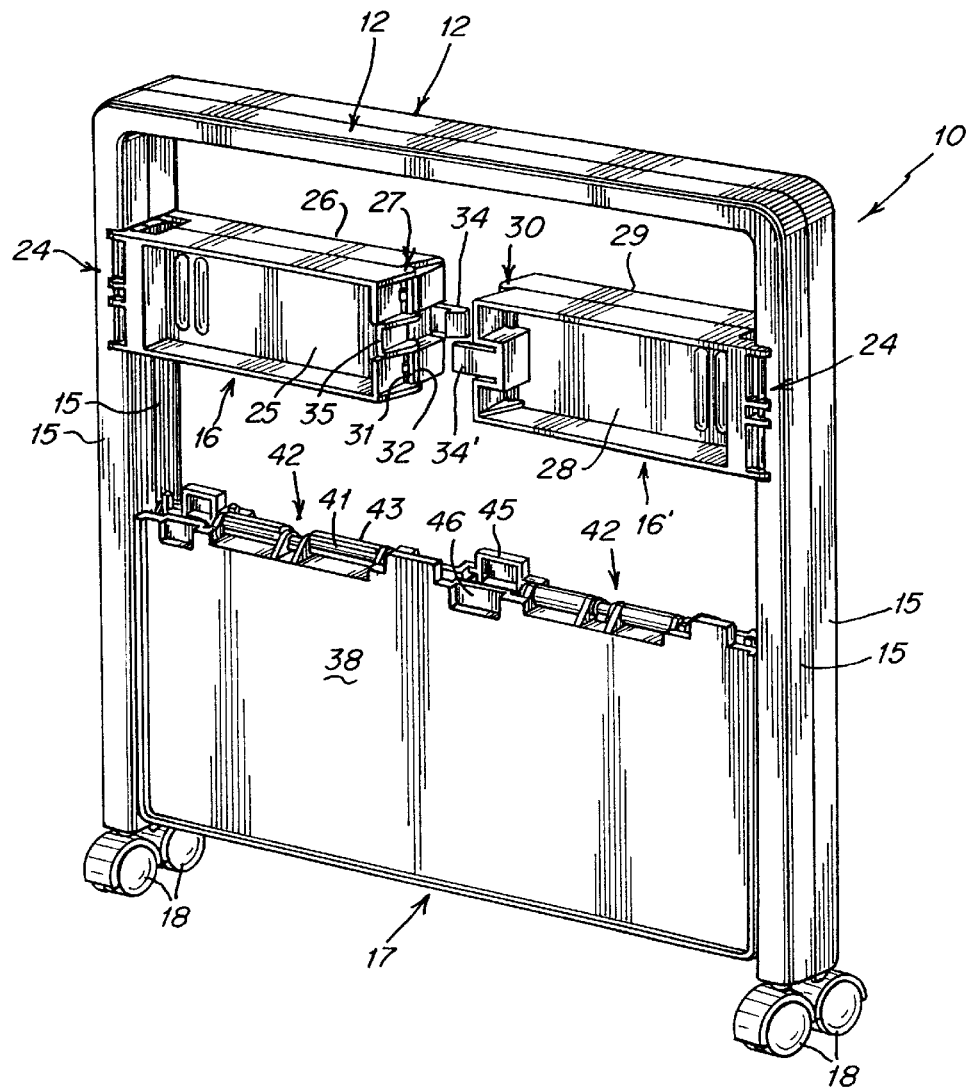
FIG. 11 is a perspective view of the cart of FIG. 1 shown fully folded for storage or for shipping.
Figure 12:
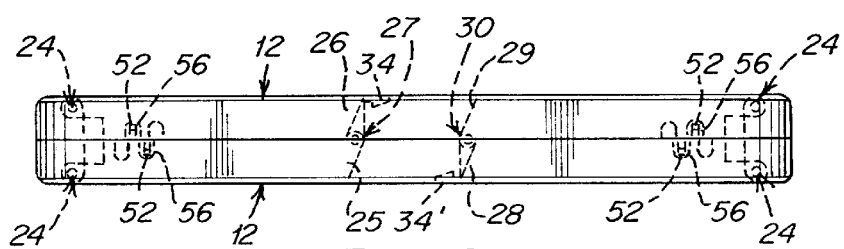
FIG. 12 is a top plan view of the folded cart of FIG. 11 with the casters removed.
Figure 13:
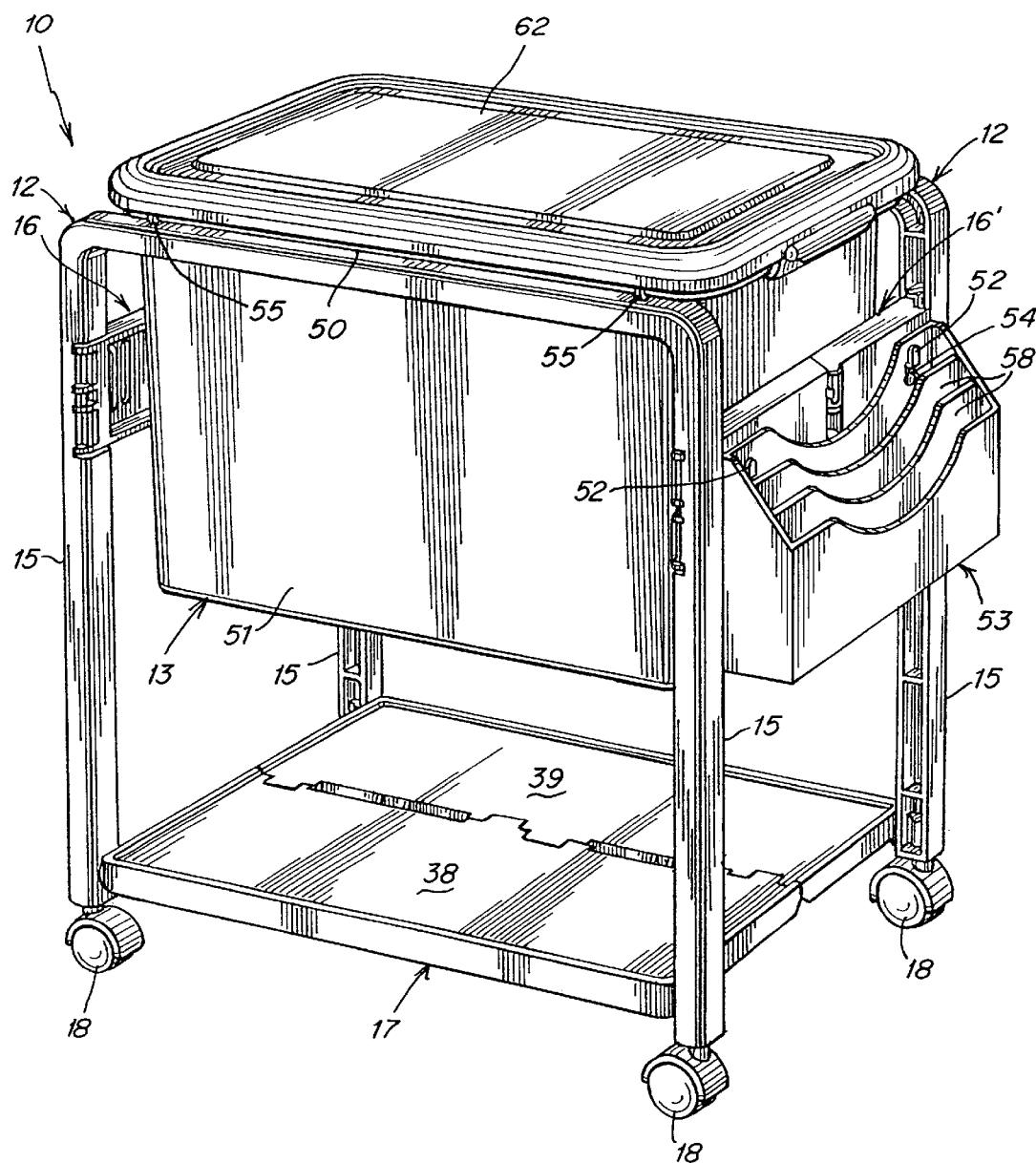
FIG. 13 is a perspective view of an alternate embodiment of the cart of the present invention shown supporting a storage container in the form of a box or tub at the top end of the cart and for supporting a secondary storage file laterally mounted on one side thereof.

The movable cart 10 of the present invention comprises a collapsible frame which can be manually unfolded into an open position as shown in perspective in FIG. 1 or manually collapsed into a closed or folded position as shown in FIG. 11. The cart 10, as shown in the first embodiment of the invention, with reference to the drawings of FIGS. 1–12 inclusive, comprises a symmetrical pair of support members 12 aligned relative to one another in parallel to form the top end of the cart 10 for supporting a storage container in the form of a box or tub 13 ( shown in FIG. 13) which may be readily mounted on or in the cart 10. The storage container 13 may be used to store files or miscellaneous items. The cart 10 in the embodiment of FIG. 13 is of identical construction to its counterpart in FIG. 1 with the same parts given the same reference numbers.

Each support member 12 in FIG. 1 has a pair of legs 15 which extend from its opposite ends in a downward direction forming an inverted U-shaped geometry. The legs 15 are preferably integrally formed in a unitary body with the support member 12 from a single mold and are preferably of a plastic composition such as polyethylene or the like. Alternatively, the legs 15 may be constructed independent of the support members 12 and connected as a pair to the opposite ends of each support member 12 in any desired conventional manner.

A foldable multi-part side arm or panel 16 interconnects one leg 15 of each support member 12 on one lateral side of the cart 10. Likewise, a complementary multi-part side arm or panel 16' interconnects the other two legs 15 on the opposite lateral side of the cart 10. In addition, the cart 10 includes a foldable multi-part tray 17 further interconnecting each of the legs 15 at each of the four diametrically opposite corners of the cart 10. The foldable tray 17 has an open or unfolded position as shown in FIG. 1 forming a level platform at the bottom end of the cart 10. A plurality of casters or wheels 18 are removably connected to the four legs 15 at the bottom end of the cart 10 to permit the cart 10 to be rolled over any level floor surface. The casters or wheels 18 are removably connected to the legs 15 by means of conventional wheel mountings 9 which project into openings at the ends of legs 15.

Each support member 12 and each of the legs 15 have a generally cylindrical U-shaped or channel-shaped configuration forming a recessed channel 19. The channel 19 in the support members 12 and legs 15 are reinforced with ribs 20 for providing increased structural rigidity and strength. This enhances the integrity of the cart 10 and improves its ability to support a fully loaded storage container 13, while keeping the weight low and the amount of plastic material low.

Figure 3:
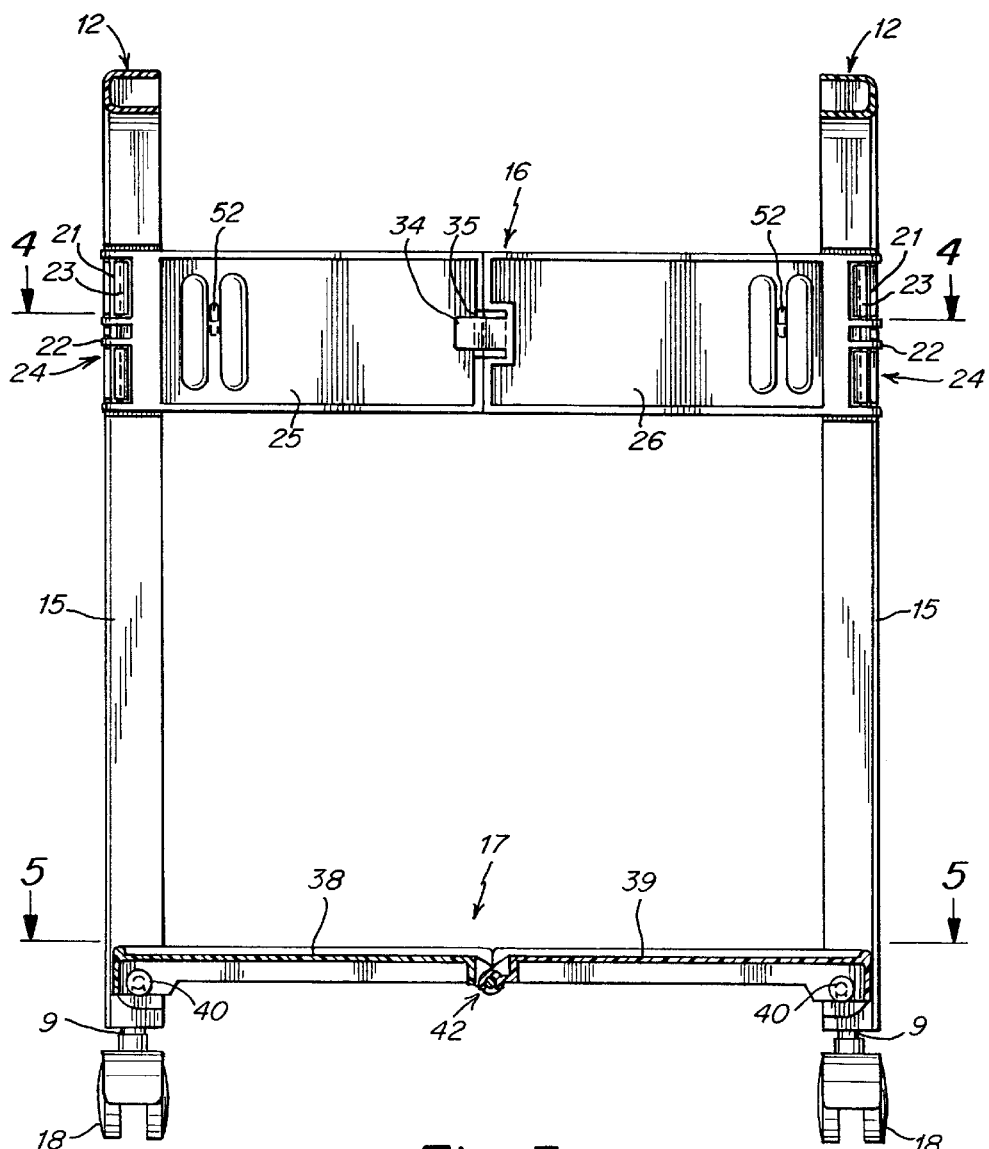
FIG. 3 is a cross sectional end view of the cart taken along the lines 3—3 of FIG. 2.
Figure 4:
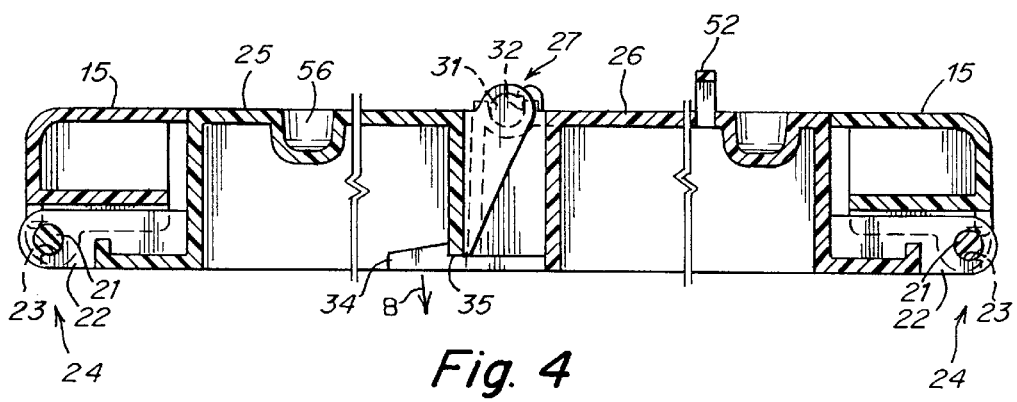
FIG. 4 is a cross sectional plan view of a side arm in the cart of FIG. 1 taken along the line 4—4 of FIG. 3.
Figure 5:
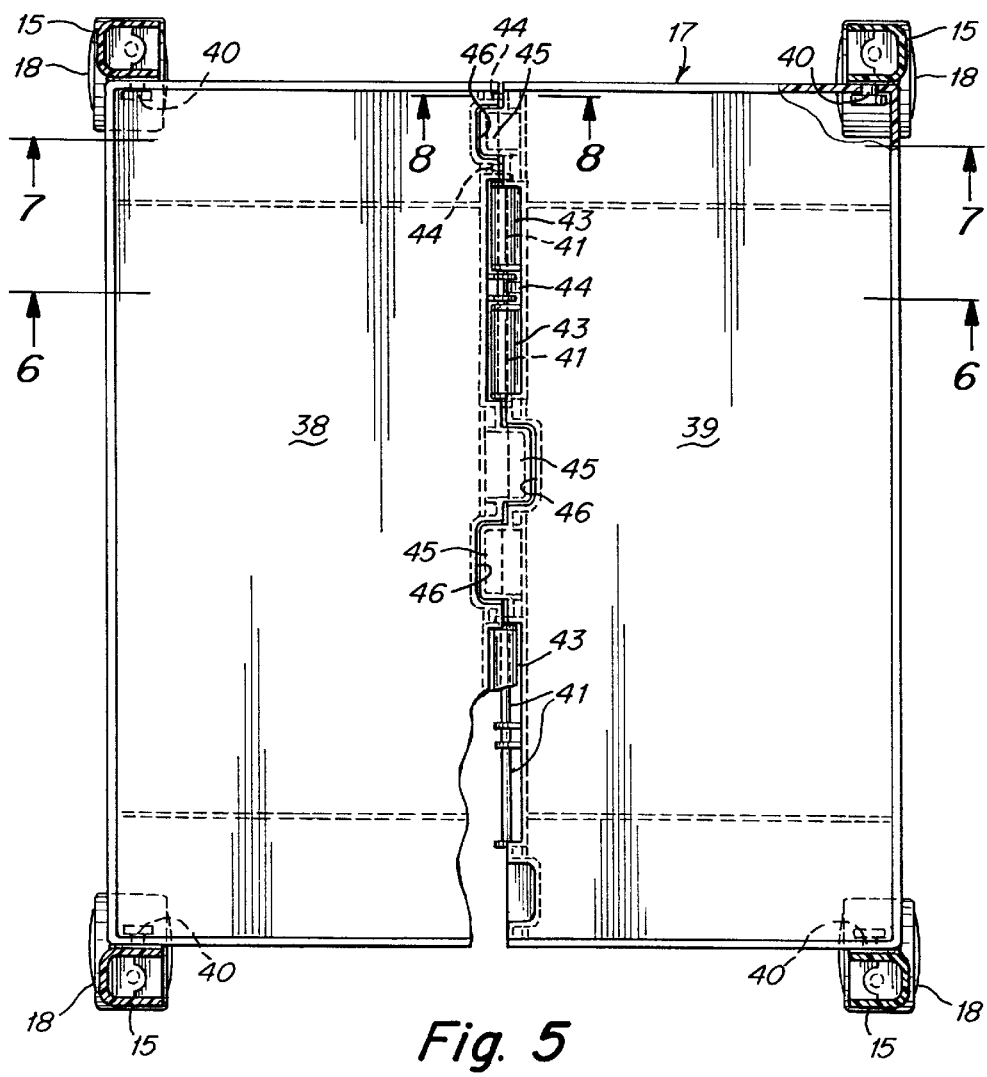
FIG. 5 is a cross sectional plan view of the tray in FIG. 1 taken along the lines 5—5 of FIG. 3.
Figure 6:
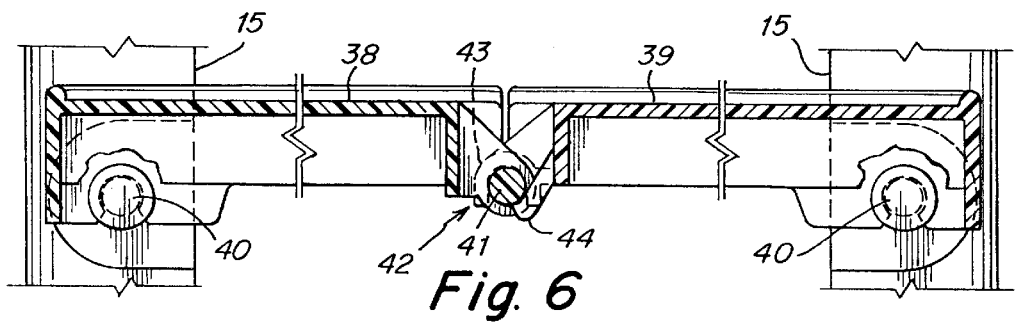
FIG. 6 is a cross sectional view of the tray in FIG. 1 taken along the lines 6—6 of FIG. 5.

The side panel 16 has two sections 25 and 26 with each section preferably of a rectangular geometry. Likewise side panel 16' has two complementary sections 28 and 29 of an equivalent rectangular geometry. As best seen in FIGS. 3 and 4, a plurality of snap fit hinge pins 21 extend from bracket portions 22 at one end of each of the sections 25 and 26 of side panel 16 and from a similar end of each of the sections 28 and 29 of side panel 16'. The snap fit hinge pins 21 snappingly press fit into sockets 23 in the legs 15 to form rotatable hinges 24 which rotatably connect the sections 25, 26 of side panel 16 and the sections 28 and 29 of side panel 16' at opposite ends thereof to the respective legs 15 as is shown more clearly in FIGS. 1, 3, 4 and 10 respectively. The two sections 25 and 26 of side panel 16 are also interconnected to each other through a rotatable hinge 27 formed from a male finger hinge pin 31 extending from section 25 which snaps into a female semi-cylindrical body 32 in section 26. Likewise the two rectangular sections 28 and 29 of side panel 16' are interconnected to one another through a rotatable hinge 30 formed from a male finger hinge pin 31' extending from section 29 which as shown more clearly in FIG. 11 snaps into a female semi-cylindrical body 32' in section 28 in a similar fashion. The rotatable hinges 27 and 30 are located at complementary positions relative to one another along the side panels 16 and 16' respectively and preferably at positions substantially intermediate the two support members 12 so as to permit the side panels 16 and 16' to fold inwardly along a common plane substantially parallel to the plane of each support member 12. The sections of each of the side panels 16 and 16' pivotally rotate about the hinges 24, 27 and 30 so as to fold inwardly with the sections of each side panel moving toward one another along a common plane transverse to the side panels 16 and 16'.

As the sections of each of the side panels 16 and 16' fold, they move inwardly in the direction shown by the arrows in FIG. 10. As best seen in FIGS. 3, 10 and 11, each side panel 16 and 16' has a locking release catch 34 and 34'. The locking release catch 34 in the side panel 16 extends from section 26 springingly or snappingly and fits over a lip 35 in section 25 to hold the two sections 25 and 26 of side panel 16 locked together. Similarly the release catch 34' in the side panel 16' extends from section 28 and springingly or snappingly fits over a corresponding lip in section 29 to hold the two sections 28 and 29 of side panel 16' locked together when the cart 10 is in the unfolded open position shown in FIG. 1. In the locked position, the support members 12 are spaced physically apart a fixed distance corresponding to the length of the unfolded side panels 16 and 16'. The locking release catch 34 and 34' must be manually opened by pulling them in the direction of arrows B and C, respectively (see FIGS. 4 and 10) to release the catches from their respective lips 35, thereby unlocking the two side panels 16 and 16', respectively, and permitting the side panels 16, 16' to fold.

Figure 7:
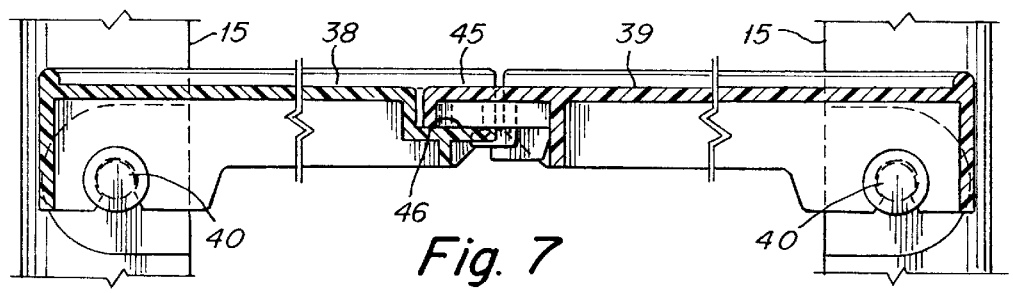
FIG. 7 is a cross sectional view of the tray in FIG. 1 taken along the lines 7—7 of FIG. 5.
Figures 8, 9:
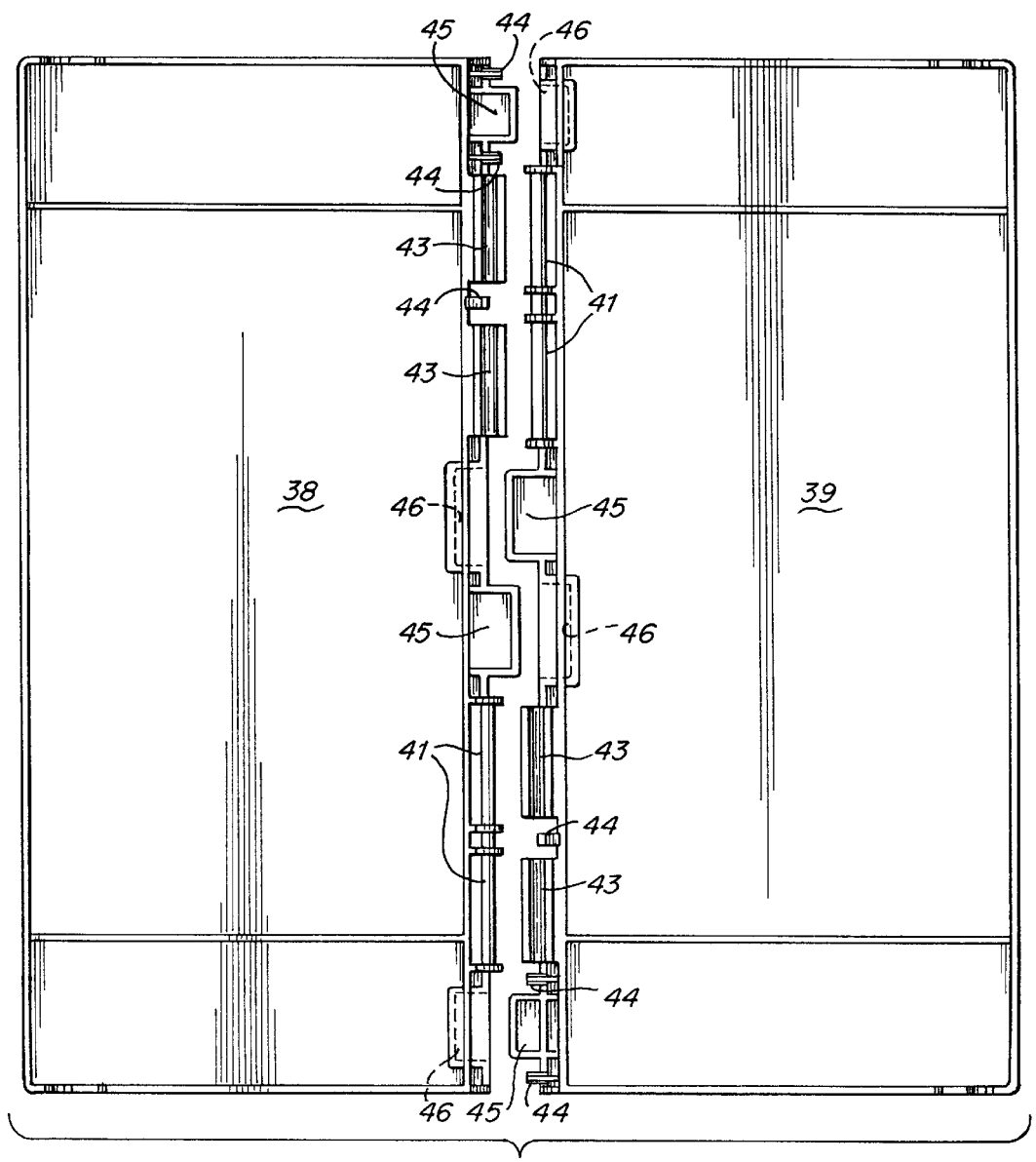
FIG. 8 is a cross sectional detail view of alignment fingers in the tray taken along the lines 8—8 of FIG. 5.
FIG.9 is an exploded bottom plan view of the tray in FIG. 1.

The bottom tray 17 includes two sections 38 and 39 of substantially rectangular geometry with the sections 38 and 39 rotatably interconnected at the opposite lateral sides of the cart 10 to the legs 15 by means of a plurality of rotatable snap fit hinges 40 as shown more clearly in FIGS. 1, 3 and 5–7 respectively. The sections 38 and 39 of the tray 17 are also interconnected to each other by a rotatable hinge 42 formed by a plurality of elongated hinge pins 41 extending from the sections 38 and 39 which respectively snap into a plurality of collars 43 each of slightly more than half barrel configuration extending from positions opposite the hinge pins 41 in sections 38 and 39 respectively. The hinge pins 41 and collars 42 protrude from alternate opposite sides of each of the sections 38 and 39 as shown more clearly in FIG. 5. In addition, a plurality of alignment fingers 44 as shown in FIGS. 8 and 9 extend between the collars 43 and function as a lead-in when rotating the sections 38 and 39 about the hinge pins 41 as well as to maintain the hinge pins 41 aligned in a plane extending between the support members 12 when the tray 17 has been folded open corresponding to when the cart 10 is in the open position. The alignment fingers 44 have curved lead-in surfaces 44' (FIGS. 8) at their free ends, and extend from the underside of each section 38 and 39 of the tray 17 at opposite ends as shown in FIGS. 7–9.

A plurality of rigid flaps 45 also extend from each of the sections 38 and 39 of bottom the tray 17 at locations along the length of the tray 17 in line with the hinge pins 41 and collars 43. The rigid flaps 45 fit into recessed areas 46 at complementary positions in each of the sections 38 and 39 opposite the rigid flaps 45 as shown in FIGS. 9 and 10 when the cart 10 is being unfolded into the open position. The rigid flaps 45 keep the surfaces of the sections 38 and 39 in flat alignment and act in concert with the fingers 44 to prevent the sections 38 and 39 from dropping down beyond the fully opened folded position shown in FIG. 2, i.e., to prevent forming an angle therebetween of over 180 degrees.

The sections 38 and 39 of the tray 17 rotate about the hinges 40 relative to the legs 15 and about the hinge pins 41 to move upwardly as shown in FIG. 10 along a plane substantially in common with the plane in which the side panels 16 and 16' fold when the cart 10 is being folded into the collapsed or closed position. When the cart 10 is in the fully closed position (see FIG. 11), the two sections 38 and 39 of the tray 17 lie folded about a substantially vertical plane located substantially intermediate the support members 12. The plane in which the sections 38 and 39 fold also lies substantially in common with the plane about which the side panels 16 and 16' fold. In the fully open position, the two sections 38 and 39 of the tray 17 lie in a substantially horizontal plane. When the tray 17 is being folded into the closed position, the support members 12 are drawn into contact with one another as shown in FIG. 11 which forms a very narrow lateral profile for easy storing or shipping of the cart 10.

Figure 14:
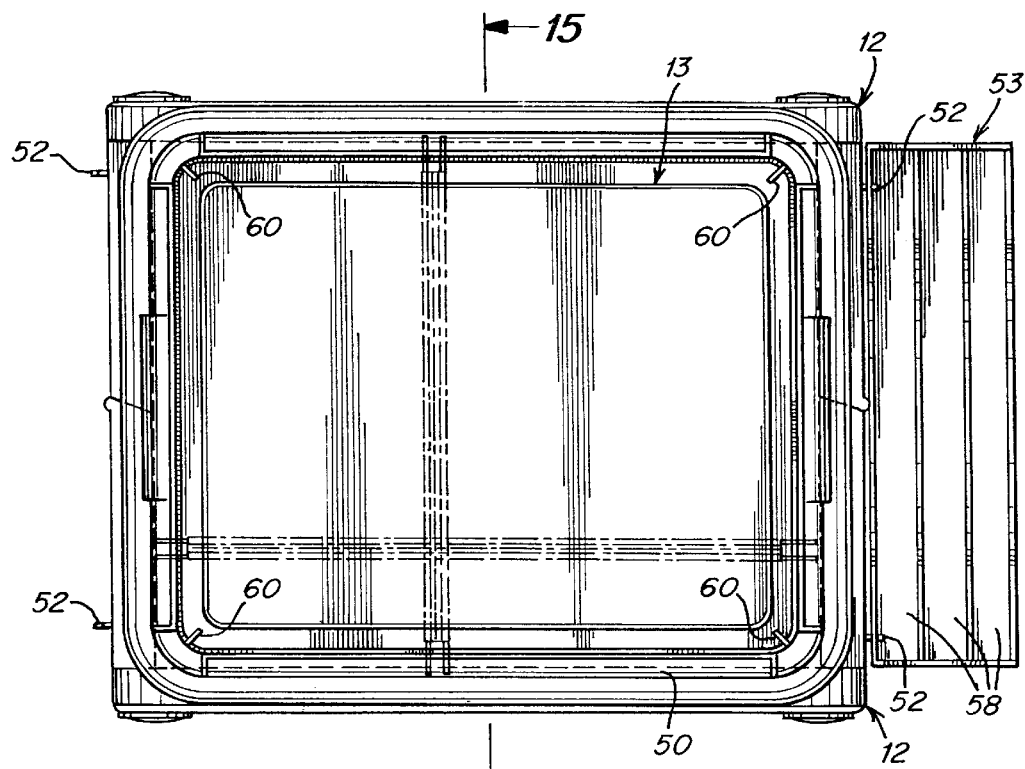
FIG. 14 is a top plan view of the embodiment shown in FIG. 13 with the cover removed from the box.
Figure 15:
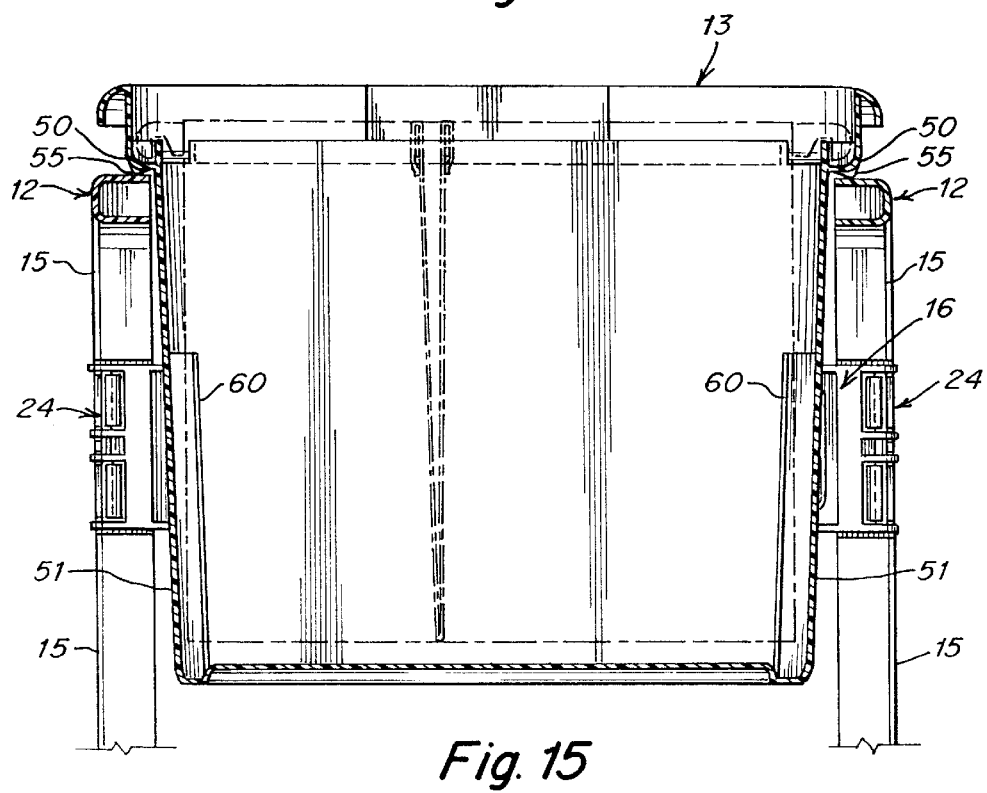
FIG. 15 is a cross sectional end view taken along the lines 15—15 of FIG. 14.

In the alternative second embodiment of the present invention as, shown in FIGS. 13 through 15, the storage container 13 is shown removably supported in the cart 10 in a position suspended from the support members 12. The storage container 13 of FIG. 13 has a curved lip 50 (see FIG. 15) extending about its periphery which is mounted on the support members 12 as shown in FIG. 15 to support the container 13 in the suspended position. The storage container 13 has a shaped body which slopes downwardly and inwardly from the lip 50 to form inclined sides 51 in cross section so as to facilitate entry and removal of the storage container 13 from the cart 10 and has vertical reinforcing ribs 60 (see FIGS. 14 and 15) at the corners of the container for structural integrity and additional support. The container 13 also has a cover 62. The lip 50 of the container 13 has support ribs 55 on the underside thereof for mounting the lip 50 on the support members 12. The cover 62 has a stop 56 for placement of the cover 62 over the container 13.

The side panels 16 and 16' of the cart 10 have a plurality of hooks 52 for hanging up a holder or rack 53 on one or both lateral sides of the cart 10 by means of keyhole slots 54 formed in the holder 53. The hooks 52 engage the respective keyhole slots 54 to securely hold the holder or rack 53. The hooks 52 are positioned in the sections 28 and 29 of the side panel 16' in proximity to the legs 15 and are spaced apart from the rotatable hinge 30 so as to fit inside indents 56 on complementary sides of the sections 28 and 29 as shown in FIG. 12 when the sections 28 and 29 are folded over with the cart 10 in its closed position as shown in FIG. 11. The holder or rack 53 which hangs from the hooks 52 has a plurality of compartments 58. When the holder or rack 53 is mounted to the cart as shown, it increases the rigidity of the opened cart and improves the structural integrity. A similar holder or rack 53 (or other types of racks, etc.) can be mounted on hooks 52 of side panel 16.

What we claim is:

1. A movable cart having a collapsible frame with the frame being foldable into a collapsed or closed position for forming a narrow lateral profile and being unfoldable into an open position, said frame comprising:

support members for supporting a removable storage container when mounted thereon;

a pair of legs extending downwardly from each support member with one leg on each opposite end thereof;

a side arm extending between two of the legs on opposite lateral sides of the frame for securing said frame in the unfolded open position with the support members physically spaced apart to support the removable storage container, said side arms having respective hinges for folding said side arms inwardly toward each other about a common plane lying substantially transverse to the side arms when said side arms are unfolded and in substantial parallel alignment with each support member; and a tray interconnecting the legs of the frame for forming a level platform adjacent a bottom end portion of the cart with the tray being foldable inwardly toward said side arms and into substantially the same common plane into which said side arms fold so that upon folding said arms and tray, said cart collapses into the closed position with each of said support members being drawn together into close proximity relative to one another; and wherein a space is provided between said side arms and said tray to permit folding of said tray in a direction toward said side arms even when said side arms are folded inwardly toward each other, so that in said closed position said side arms and said tray do not interfere with each other and do not extend out from the periphery of said support members and legs.

2. A movable cart as defined in claim 1, wherein the support members of said cart are symmetrical and aligned relative to one another in parallel at the top end of the cart for supporting said storage container.

3. A movable cart as defined in claim 2, wherein each pair of legs is integrally formed with a respective support member and together form a substantially inverted "U" shaped member.

4. A movable cart as defined in claim 3, wherein each side arm has two sections with each section having a rotatable hinge at each opposite end thereof connected to a leg of said cart and with each section being interconnected to one another at the other end thereof through a rotatable hinge so that the two sections of each side arm pivotally rotate about said hinged connections to cause the two sections of each side arm to fold over one another as the sections of each side arm move toward one another along said common plane.

5. A movable cart as defined in claim 4, wherein each section of each side arm has a plurality of hinge pins extending from one end thereof for insertion into a socket of a corresponding leg located at each respective corner of said cart.

6. A movable cart as defined in claim 5, wherein the rotatable hinge interconnecting each section of each side arm to one another is located at a position in each side panel substantially intermediate said support members so as to permit the sections of each side panel to fold inwardly along a common plane substantially in parallel to said support members while folding said cart into the closed position.

7. A movable cart as defined in claim 6, wherein each side arm further comprises a locking release catch to inhibit the folding of said side arms when said cart is in the unfolded open position.

8. A movable cart as defined in claim 3, wherein said tray comprises two foldable sections with each section rotatably connected to a leg on opposite lateral sides of said cart and being rotatably hinged to one another such that the sections of the tray fold when closing said cart in a direction along a plane lying substantially in common with the plane along which the side arms fold.

9. A movable cart as defined in claim 8, wherein each section of said tray comprises a plurality of rotatable snap fit hinges connecting each section to a corresponding leg of said cart at each corner thereof respectively.

10. A movable cart as defined in claim 9, wherein each section of said tray is interconnected to one another through a rotatable hinge so as to permit each section of the tray to fold over one another about said hinge in an upward direction.

11. A movable cart as defined in claim 10, wherein each section of said tray comprises a plurality of elongated hinge pins extending therefrom and a plurality of collars of substantially half barrel configuration extending from corresponding positions along the sections opposite the hinge pins respectively for forming said rotatable hinge.

12. A movable cart as defined in claim 11, wherein when the cart is in fully closed position the two sections of the tray lie folded about a substantially vertical plane located substantially intermediate the support members.

13. A movable cart as defined in claim 12, further comprising a plurality of alignment fingers extending from each section of the tray to maintain the alignment of the tray when opened.

14. A movable cart as defined in claim 13, further comprising a plurality of rigid flaps extending from each of the sections along the length of the length of the sections and a plurality of recessed areas located at complementary positions opposite the rigid flaps to maintain a flat level surface for the sections when the tray is folded to the open position.

15. A movable cart as defined in claim 3, wherein said substantially inverted "U" shaped member is integrally formed in one piece.

16. A movable cart having a collapsible frame which can be manually folded from a fully open position into a folded up or closed position having a narrow lateral profile and refolded back into the fully open position when needed, said frame comprising:

horizontal support members;

a pair of legs extending downwardly from each support member, with one leg on each opposite end thereof;

a side arm extending between two of the legs on opposite lateral sides of the frame for securing said frame in the unfolded open position with the support members physically spaced apart;

said side arms having respective hinges for folding said side arms inwardly toward each other about a common plane lying substantially transverse to the side arms when unfolded and in substantial parallel alignment with each support member; and a tray interconnecting the legs of the frame for forming a level platform adjacent a bottom end portion of the cart with the tray being foldable upward and inwardly toward said side arms and into substantially the same common plane into which said side arms fold so that upon folding said arms and tray, said cart collapses into the closed position with each of said support members being drawn together into close proximity relative to one another;

wherein a space is provided between said side arms and said tray to permit folding of said tray upwardly in a direction toward said side arms even when said side arms are folded inwardly toward each other, so that in said closed position said side arms and said tray do not interfere with each other and do not extend out from the periphery of said support members and legs.

17. A movable cart as defined in claim 16, further comprising a storage container removably mounted between said support members and supported by said support members.

18. A movable cart as defined in claim 17, wherein said storage container has:

a lip extending from the periphery of the container for mounting said container on said support members; and a sloped body which inclines downwardly from said lip.

19. A movable cart as defined in claim 18, wherein each side arm has two sections interconnected to one another about a rotatable hinge.

20. A movable cart as defined in claim 19, wherein at least one of said side arms has hooks in each section thereof for connecting a holder or rack along a lateral side of said of said cart with said cart in the fully open position.

21. A movable cart as defined in claim 20, wherein:

said hooks lie in close proximity to the hinges about which said side arm folds relative to the legs; and comprising detents in such legs for receiving said hooks when said cart is fully folded into the closed position.

22. A movable cart as defined in claim 16, wherein each pair of legs is integrally formed with a respective support member and together form a substantially inverted "U" shaped member.

23. A movable cart as defined in claim 22, wherein said substantially inverted "U" shaped member is integrally formed in one piece.

24. A movable cart having a collapsible frame with the frame being foldable into a collapsed or closed position for forming a narrow lateral profile and being unfoldable into an open position, said frame comprising:

a pair of transverse support members for supporting a removable storage container when mounted thereon;

a pair of legs extending downwardly from each support member with one leg on each opposite end of each support member;

a side arm extending between two of the legs on opposite lateral sides of the frame for securing said frame in the unfolded open position with the support members physically spaced apart to support the removable storage container, said side arms each having a respective hinge at at least one side thereof and about which said side arms are pivotable inwardly toward a respective support member and in a direction so as to be in substantial alignment with a respective support member; and a tray interconnecting the legs of the frame for forming a level platform adjacent a bottom end portion of the cart with the tray being foldable inwardly toward said side arms so that upon folding of said tray and pivoting of said side arms toward said respective support member, said cart collapses into the closed position with each of said support members being drawn together into close proximity relative to one another; and wherein a space is provided between said side arms and said tray to permit folding of said tray in a direction toward said side arms even when said side arms are pivoted inwardly, so that in said closed position said side arms and said tray do not interfere with each other and do not extend out from the periphery of said support members and legs.

25. A movable cart as defined in claim 24, wherein each pair of legs is integrally formed with a respective support member and together form a substantially inverted "U" shaped member.

26. A movable cart as defined in claim 25, wherein said substantially inverted "U" shaped member is integrally formed in one piece.

27. A movable cart as defined in claim 25, wherein said tray comprises two foldable sections with each section rotatably connected to a leg on opposite lateral sides of said cart and being rotatably hinged to one another such that the sections of the tray fold toward said support members when closing said cart.

28. A movable cart having a collapsible frame which can be manually folded from a fully open position into a folded up or closed position having a narrow lateral profile and refolded back into the fully open position when needed, said frame comprising:

horizontal support members;

a pair of legs extending downwardly from each support member, with one leg on each opposite end of each support member;

a side arm extending between two of the legs on opposite lateral sides of the frame for securing said frame in the unfolded open position width the support members physically spaced apart;

said side arms each having a respective hinge at at least one side thereof and about which said side arms are pivotable inwardly toward a respective support member and in a direction so as to be in substantial alignment with a respective support member; and a tray interconnecting the legs of the frame for forming a level platform adjacent a bottom end portion of the cart with the tray being foldable upward and inwardly toward said side arms so that upon folding of said tray and pivoting of said side arms toward said respective support member, said cart collapses into the closed position with each of said support members being drawn together into close proximity relative to one another;

wherein a space is provided between said side arms and said tray to permit folding of said tray upwardly in a direction toward said side arms even when said side arms are pivoted inwardly, so that in said closed position said side arms and said tray do not interfere with each other and do not extend out from the periphery of said support members and legs.

29. A movable cart as defined in claim 28, wherein each pair of legs is integrally formed with a respective support member and together form a substantially inverted "U" shaped member.

30. A movable cart as defined in claim 29, wherein said substantially inverted "U" shaped member is integrally formed in one piece.

31. A movable cart as defined in claim 28, wherein said tray comprises two foldable sections with each section rotatably connected to a leg on opposite lateral sides of said cart and being rotatably hinged to one another such that the sections of the tray told toward said support members when closing said cart.

* * * * *